US006588449B1

(12) United States Patent
Kippe

(10) Patent No.: US 6,588,449 B1
(45) Date of Patent: Jul. 8, 2003

(54) DIESEL FUEL SHUT-OFF DEVICE

(75) Inventor: Bradley N. Kippe, Holly, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 09/652,674

(22) Filed: Aug. 31, 2000

(51) Int. Cl.[7] ......................... F16K 31/34; F16K 31/42; F02M 37/08

(52) U.S. Cl. ........................... 137/399; 123/509; 137/2; 137/195; 137/414; 137/415; 137/554; 137/556; 137/558; 137/565.01; 137/565.16; 137/590; 417/295

(58) Field of Search ................................ 137/395, 398, 137/399, 414, 415, 554, 565.01, 565.16, 558, 556.3, 2, 195, 590, 556; 123/509, 512, 514; 251/28, 30.01, 30.02, 45, 46; 417/279, 295

(56) References Cited

U.S. PATENT DOCUMENTS 1,437,861 A * 12/1922 Porter ....................... 251/61.3
1,576,889 A * 3/1926 Wulf ......................... 251/61.3
1,921,551 A * 8/1933 Temple ...................... 251/61.3
1,987,070 A * 1/1935 La Bour ..................... 137/399
2,409,965 A * 10/1946 Udale ......................... 137/399
2,589,346 A * 3/1952 De Frees ................... 251/61.3
2,726,674 A * 12/1955 Davies ....................... 137/414
2,748,799 A * 6/1956 Rath ......................... 251/61.3
2,843,145 A * 7/1958 Koehler et al. ............. 137/414
2,939,476 A * 6/1960 Absolon ..................... 137/415
4,469,124 A * 9/1984 Bronsky et al. ........... 251/61.3
4,672,937 A 6/1987 Fales et al. ................. 123/509
4,715,345 A 12/1987 Reames, Jr. ................ 123/512
4,807,582 A 2/1989 Tuckey ....................... 123/514
4,960,088 A 10/1990 Havemann et al. ......... 123/198
4,974,570 A 12/1990 Szwargulski et al. ....... 123/509
5,050,567 A 9/1991 Suzuki ....................... 123/514
5,054,508 A * 10/1991 Benjey ...................... 251/61.3
5,170,764 A 12/1992 Tuckey ....................... 123/509
5,201,298 A 4/1993 Shearn ....................... 123/514
5,390,697 A * 2/1995 Muschelknautz .......... 251/61.3
5,647,331 A 7/1997 Swanson .................... 123/516
6,058,964 A * 5/2000 Cotton et al. ............... 137/399

* cited by examiner

*Primary Examiner*—George L. Walton

(57) ABSTRACT

Fuel shut-off device for use in a diesel fuel tank to discontinue fuel flow to a fuel pump comprises a valve seat forming a fuel flow opening for fuel to flow from the fuel tank to the fuel pump, a fuel control valve cooperably disposed relative to the valve seat to control fuel flow from the fuel tank to the fuel pump, and a spring biasing the fuel inlet valve to a closed position against the valve seat. A diaphragm is provided having a first valve-actuating side for moving the fuel inlet valve relative to the valve seat against bias of the spring and a second side. The second side is communicated to a control chamber having an inlet orifice that is communicated to the fuel tank and an outlet orifice that is communicated to said fuel pump. An inlet orifice valve is disposed in the fuel tank and is actuated to open the inlet orifice to the fuel tank when the fuel level is above a predetermined low level to cause the diaphragm to move toward the fuel inlet valve to move it to an open position relative to the valve seat against bias of the spring and actuated to close the inlet orifice to the fuel tank when the fuel level is at the predetermined low level to cause the diaphragm to move away from the fuel inlet valve to allow the spring to move the fuel inlet valve to the closed position to provide insufficient fuel flow to the fuel pump to maintain engine operation, thereby preventing air from being ingested into the fuel pump.

16 Claims, 3 Drawing Sheets

DIESEL FUEL SHUT-OFF DEVICE

FIELD OF THE INVENTION

The present invention relates to a diesel fuel shut-off device for a diesel engine to prevent air from being ingested into the fuel system when the fuel tank is empty.

BACKGROUND OF THE INVENTION

Diesel fuel systems of motor vehicles historically have had problems when they run out of fuel and air is ingested through the fuel pump into the fuel line. The ingested air in the fuel line causes rough starting of the engine. Even if the vehicle operator adds diesel fuel to the fuel tank, the engine may not start again as a result of the air ingested in the fuel line. In some cases, the air must be drained from the fuel supply rail on the diesel engine. Draining of the air from the fuel rail is effected by a service attendant using bleed valves on the fuel rail.

An object of the present invention is to provide a fuel shut-off device for a diesel engine that prevents air from being ingested into the fuel system when the fuel tank is empty.

SUMMARY OF THE INVENTION

The present invention provides in one embodiment a fuel shut-off device and method for a diesel fuel tank of a motor vehicle to discontinue fuel flow to a fuel pump before air can be ingested into the fuel system when the fuel tank is near empty. A fuel control valve is controlled by diaphragm between open and closed valve positions relative to a valve seat depending on fuel level in the fuel tank. The fuel control valve is moved to the closed position relative to the valve seat when the fuel level in the tank is at a predetermined low (near empty) level to provide insufficient fuel to the fuel pump to maintain engine operation so as to cause the engine to stop operation before air is ingested in the fuel system. The fuel control valve is moved to the open position relative to the valve seat when the fuel level in the tank is above the predetermined low (near empty) level.

In an embodiment of the invention, the fuel shut-off device comprises a spring biased fuel control valve cooperably disposed relative to a valve seat to control fuel flow from the fuel tank to the fuel pump. The fuel control valve is actuated between open and closed positions relative to the valve seat by movement of a diaphragm controlled by pressure of fuel in a control chamber and a valve spring. The control chamber includes an inlet orifice communicated to the fuel tank and an outlet orifice communicated to the fuel pump. An inlet orifice valve is disposed in the fuel tank to open or close the inlet orifice of the control chamber to the fuel tank depending upon fuel level in the fuel tank. The inlet orifice is open to the fuel tank when the fuel level is above a predetermined low (near empty) level such that the diaphragm is caused to move toward the fuel control valve to move it to the open position relative to the valve seat against bias of the spring. The inlet orifice is closed to the fuel tank when the fuel level is at the predetermined low level such that the diaphragm is caused to move in an opposite direction by the fuel control valve and the biasing spring to allow the biasing spring to move the fuel control valve to the closed position to thereby terminate fuel flow to the fuel pump. Closure of the fuel control valve when the fuel level is at the predetermined low (near empty) level prevents the fuel pump from drawing sufficient fuel to maintain engine operation, thereby causing the engine to stop before air can be ingested into the fuel pump.

In a particular embodiment of the invention, the inlet orifice valve comprises a float that is disposed in the fuel tank and movable with fuel level therein so as to close the inlet orifice of the control chamber when fuel level is at the predetermined low level.

In another embodiment of the invention, the inlet orifice valve comprises a solenoid actuated valve that is electrically actuated to close the inlet orifice in response to the fuel level being at the predetermined low level. A fuel level sensor is provided in the fuel tank to provide a signal to actuate the solenoid actuated valve to close the inlet orifice of the control chamber when the fuel level is at the predetermined low level.

The above objects and advantages of the invention will become more readily apparent from the following description taken with the following drawings.

DETAILED DESCRIPTION OF THE INVENTION

Figure 1:
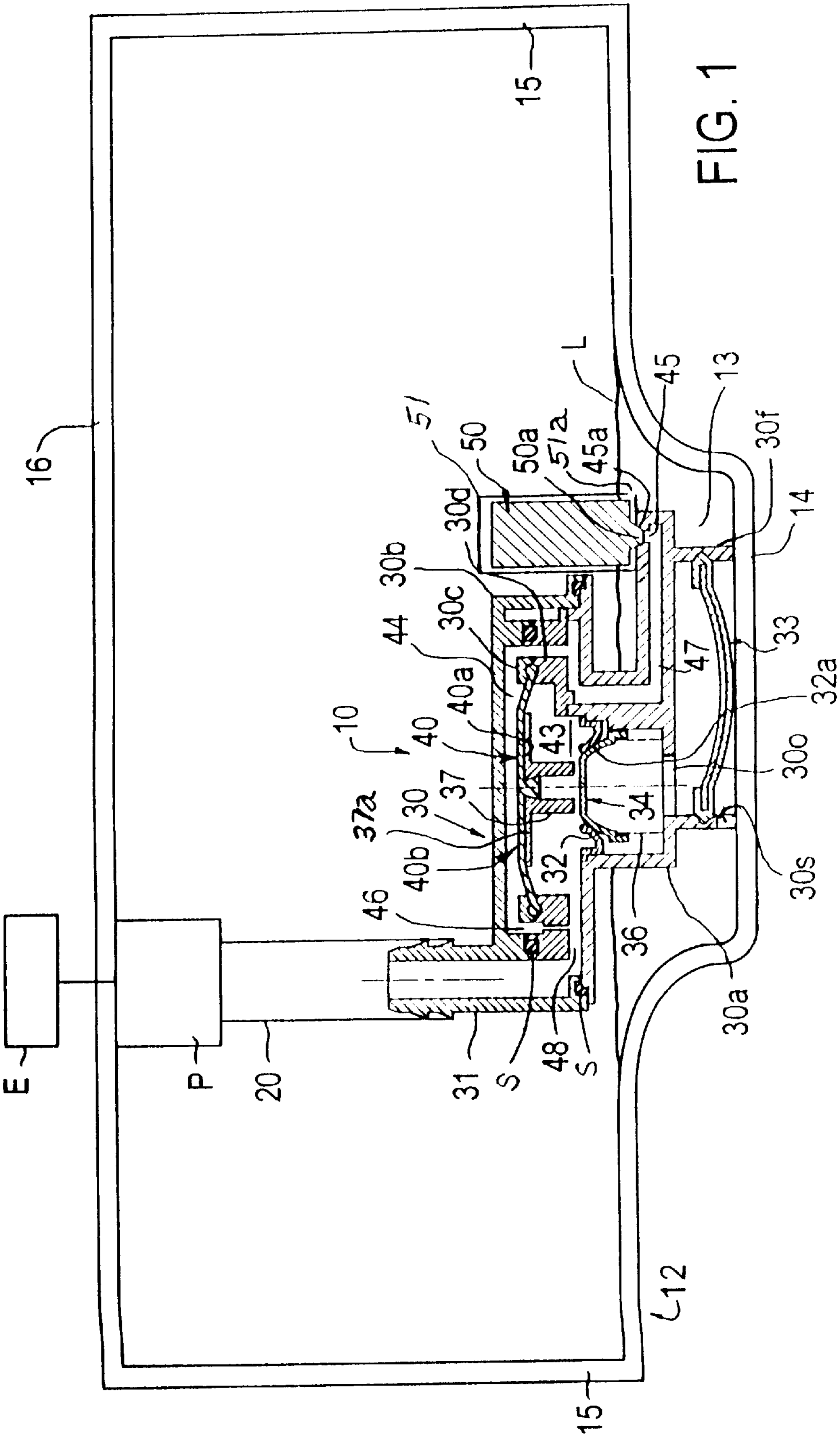
FIG. 1 is a sectional view of a diesel fuel shut-off device having a fuel float to open/close the inlet orifice of the control chamber pursuant to an embodiment of the invention.
Figure 2:
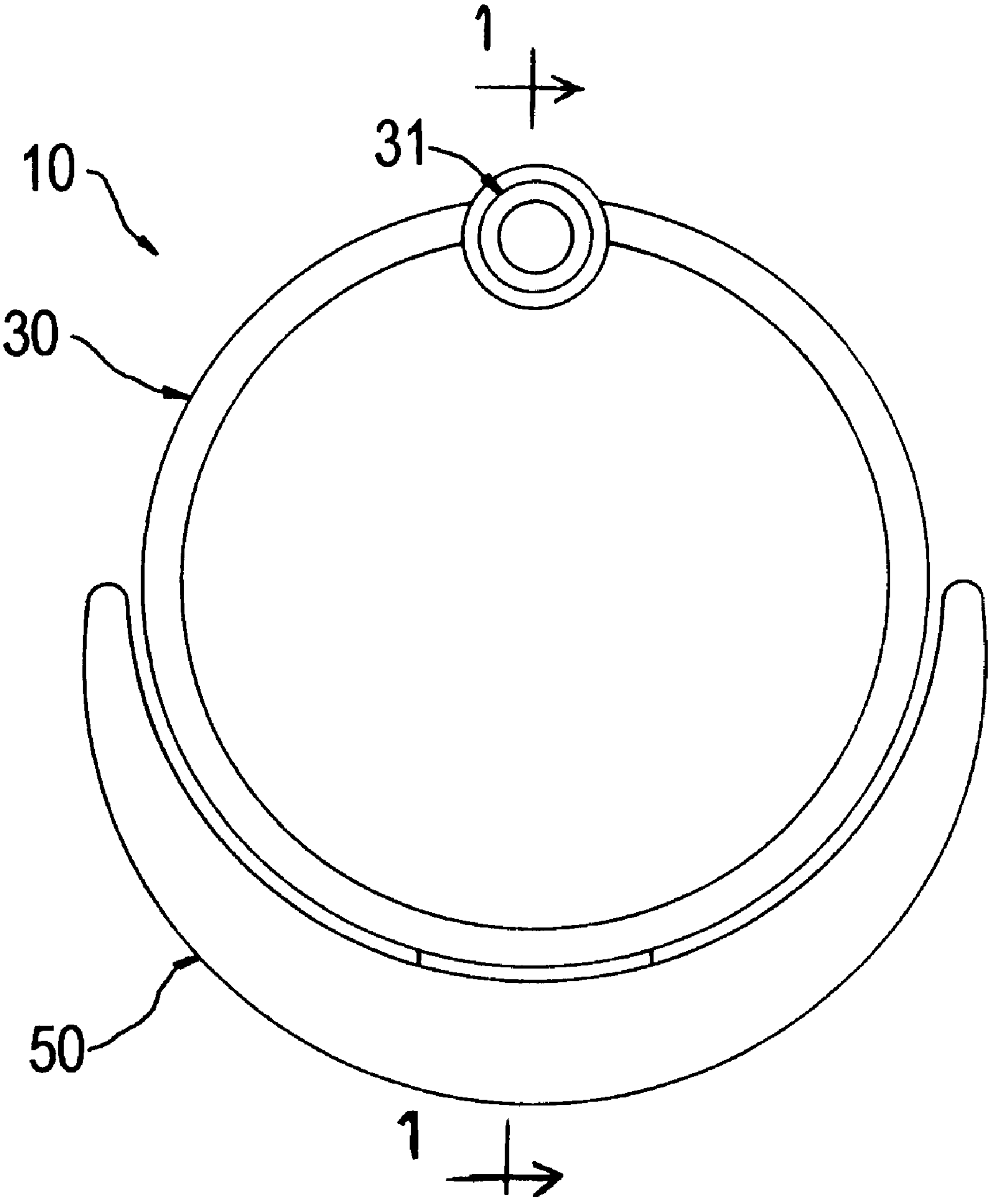
FIG. 2 is a plan view of the fuel shut-off device with the float tube omitted to show the fuel float having an arcuate configuration in plan.

Referring to FIGS. 1–2, a diesel fuel shut-off device 10 for use in a conventional diesel fuel tank 12 for a motor vehicle, such as a truck, automobile, or other vehicle powered by a diesel internal combustion engine, is shown for purposes of illustration and not limitation. The fuel shut-off device 10 is received in a recess or well 13 provided in a bottom wall 14 of the fuel tank 12. The fuel tank 12 also includes side walls 15 and top wall 16 in conventional manner.

The fuel shut-off device 10 is connected by fuel line or conduit 20 to a conventional fuel pump P, schematically shown, residing in or outside of the fuel tank 12. The fuel pump 20 pumps the liquid diesel fuel to a conventional diesel engine E, schematically shown, of the motor vehicle.

The fuel shut-off device 10 comprises a generally cylindrical housing 30 made of a suitable fuel resistance plastic material such as acetal, metallic material or any other suitable material. The housing 30 can comprise molded plastic housing sections 30*a*, 30*b* connected and sealed together by snap-fits or plastic welding with optional o-ring or other seals S. The lower housing section 30*a* includes a plastic, metal or other insert 32 affixed by snap-fit or welding therein and forms a valve seat 32*a* defining a fuel flow opening for fuel to flow from the interior of the fuel tank 12 to the fuel pump P via the fuel line or conduit 20. The fuel line or conduit 20 is connected to a barbed fitting 31 of the housing 30 by press fit or press fit with a conventional hose clamp.

The housing section 30*a* includes a fuel inlet opening 30*o* that communicates to the interior of the fuel tank 12 via a fuel filter 33. The filter 33 is provided on an annular cylindrical housing support foot or base 30*f* that rests on the bottom wall 14 in the recess 13 of the fuel tank 12. The annular support foot or base 30*f* includes radial slots 30*s* (one shown) that provide a fuel flow path from the fuel tank recess 13 to the fuel inlet opening 30*o*.

A spring biased fuel control poppet valve 34 is cooperably disposed in the housing section 30*a* relative to the valve seat 32*a* to control fuel flow from the fuel tank 12 to the fuel pump P. Coil spring 36 biases the fuel control poppet valve 34 to a closed position against the valve seat 32*a,* FIG. 1. The poppet valve 34 is movable vertically up and down relative to valve seat 32*a* in FIG. 1.

A flexible diaphragm 40 is provided above the poppet valve 34 in a chamber in the housing 30. The diaphragm 40 has a disc shape with a circular periphery that is trapped and affixed between housing sections 30*c,* 30*d* which are held together by snap-fit or welding.

The flexible diaphragm 40 includes a first valve-actuating side 40*a* adjacent a lower fuel chamber 43 for moving the fuel control poppet valve 34 relative to valve seat 32*a* against bias of coil spring 36. The fuel chamber 43 is communicated to the suction side of the fuel pump P. A depending cylindrical tubular projection 37 is attached to the diaphragm and extends downwardly from side 40*a* for pushing the fuel control valve 34 downwardly against bias of spring 36 to the open position relative to valve seat 32*a* when the fuel level in fuel tank 12 is greater than a predetermined low (near empty) level L illustrated in FIG. 1. The projection 37 includes an integral lateral flange 37*a* adjacent the diaphragm 40 and can be fastened on the diaphragm by snap-fit engagement of a central bulbous region of diaphragm 40 in the bore of the projection 37, by one or more fasteners (not shown), or any other fastening technique.

The diaphragm 40 includes an opposite second control side 40*b* that is communicated to a control chamber 44 formed above the diaphragm 40 in the housing section 30*b*. The control chamber 44 communicates to an inlet orifice 45 that is communicated to control chamber 44 by passage 47 and to the interior of the fuel tank 12 and also communicates to a restricted outlet (bleed) orifice 46 that is communicated to the suction side of the fuel pump P via a radially extending fuel flow passage 48 that communicates to the fitting 31 and thus the fuel line or conduit 20 to the pump P. The outlet orifice 46 is calibrated relative to inlet orifice 45 to provide a relatively higher pressure (for example only, atmospheric or near atmospheric pressure) of fuel in chamber 44 and thus on diaphragm side 40*b* than on the other side 40*a* (i.e. pump P suction) when a fuel float 50 is open relative to valve seat 45*a.* This relatively higher pressure on diaphragm side 40*b* than on side 40*a* causes the diaphragm 40 to push the valve 34 open against bias of spring 36. The outlet orifice 46 is calibrated relative to inlet orifice 45 to provide a relatively lower pressure of fuel in chamber 44 and thus on diaphragm side 40*b* that is generally equal to the fuel pressure on the other diaphragm side 40*a* (i.e. pump P suction side) when the fuel float 50 is closed relative to valve seat 45*a.* Equalization of pressure on sides 40*a,* 40*b* of diaphragm 40 allows spring 36 to close the valve 34 on valve seat 32*a.*

The inlet orifice 45 includes a valve seat 45*a* that provides a seat for a float valve projection 50*a* on the end of fuel float 50 having an arcuate or any other float configuration. The fuel float 50 is received in a float tube 51 disposed on housing 30. The float tube 51 is configured to receive the float 50 such that it can move up or down in the tube 51 as the fuel level L in the fuel tank 12 rises or falls in the vicinity of orifice 45. The float tube 51 includes multiple apertures 51*a* (one shown) communicated to fuel tank 12 to allow fuel to enter the tube. The fuel float 50 is positioned to move up or down with its the longitudinal centerline or axis aligned with the centerline of the inlet orifice 45 and its valve seat 45*a* to seat thereon when the fuel level L is at a predetermined low (near empty) fuel level where the pump P draws insufficient fuel to maintain engine operation as explained below. The predetermined low (near empty) fuel level L at which fuel flow to pump P is discontinued will be vary with the type of fuel tank 12, its configuration, but is desired to leave as little unusable fuel as possible in the fuel tank and can be determined empirically for any given diesel fuel tank. In FIG. 1, the predetermined low level L corresponds to a fuel level that fills only the recess 13 at the bottom wall 14 of the fuel tank 12.

In operation of the diesel engine with the fuel level in fuel tank 12 above the predetermined low (near empty) level L, the float 50 will follow the fuel level as controlled by tube 51 such that float valve projection 50*a* is above the inlet orifice 45, which thus remains open to the interior of the fuel tank 12 as the fuel pump P is pumping fuel to the engine E. During this time, as a result of the calibrated restricted outlet orifice 46, the fuel pressure in the control chamber 44 is relatively higher than the fuel pressure in chamber 43 (communicated to the suction side of pump P) below the diaphragm 40 such that the diaphragm 40 is displaced downwardly with tubular projection 37 engaging against the top of the fuel control poppet valve 34 to push it downwardly to an open position relative to the valve seat 32 to provide flow of fuel to the pump P as called for by the pump.

However, when the fuel level in fuel tank 12 falls to the predetermined low (near empty) level L, the float 50 falls correspondingly so that float valve projection 50*a* engages and seals on inlet orifice seat 45*a* to close off the inlet orifice 45 to the interior of the fuel tank 12. As a result, fuel in control chamber 44 is not replenished, and the pressure of fuel drops in control chamber 44 as fuel in chamber 4 bleeds out of outlet orifice 46 as the engine E continues operation so as to be generally equal to the fuel pressure present in chamber 43 below the diaphragm 40. As a result, the diaphragm 40 will be pushed up by the valve 34 and coil spring 36. The spring 36 biases valve 34 to seal on valve seat 32*a* to close off fuel flow to the fuel line or conduit 20, FIG. 1. Although some small fuel flows to the pump P for a short time as permitted by outlet orifice 46, the fuel flow is insufficient to maintain engine operation, and the engine stops within a short time from fuel starvation before air can be ingested into the fuel pump P. Stopping of the diesel engine E in this manner prevents air from being ingested into the fuel pump P when the fuel tank 12 is near empty of diesel fuel.

Figure 3:
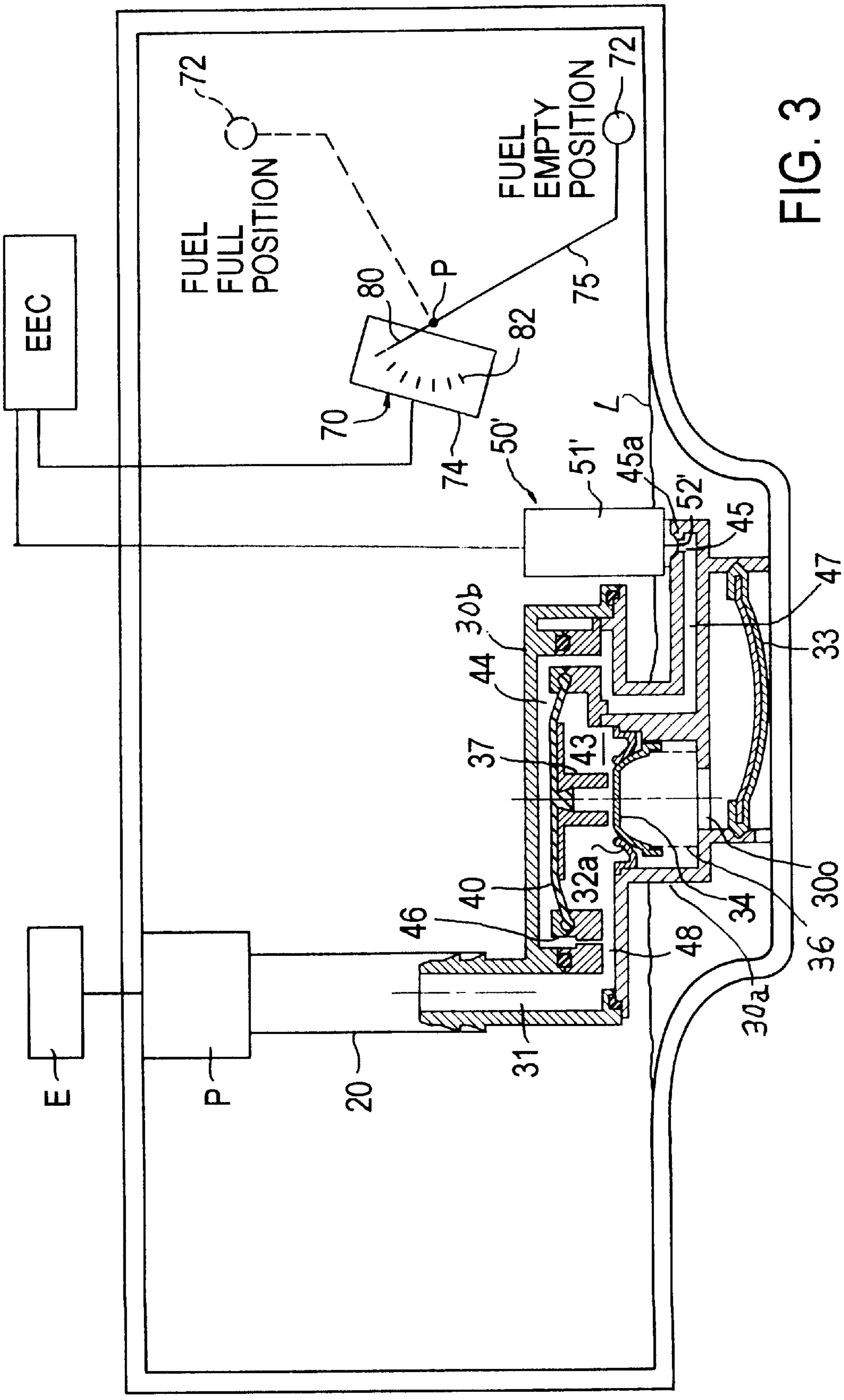
FIG. 3 is a sectional view of a diesel fuel shut-off device having a solenoid-actuated inlet orifice valve pursuant to another embodiment of the invention.

FIG. 3 illustrates another embodiment of the invention similar to the FIGS. 1–2 and thus like reference numerals are used to designate like features. The embodiment of FIG. 3 differs from that of FIG. 1 in that fuel float 50 is omitted and a solenoid actuated inlet orifice valve 50' is used instead to close off the inlet orifice 45 when the fuel level in fuel tank 12 is below the predetermined low fuel level L. In particular, the solenoid actuated inlet orifice valve 50' comprises a solenoid actuator 51' and a valve 52' connected to the armature of the solenoid actuator 51' so that the valve 52' can be moved relative to orifice seat 45*a* to open or close the inlet orifice 45 depending the fuel level in the fuel tank 12 as described above. The solenoid actuator 51' can be disposed on the housing 30 in the fuel tank 12, or alternately it can be disposed at other locations in the fuel tank or outside the fuel tank on or near the fuel tank and connected to the valve 52' by suitable linkage (not shown). This embodiment of the invention includes a conventional fuel level sensor 70 to sense the current level of the fuel in the fuel tank. The sensor 70 is shown in FIG. 3 including a fuel float 72 on an arm 75 that pivots about pivot P in the fuel tank 12. The float arm 75 is connected to a wiper 80 of the sensor 70 such that the wiper 80 rotates relative to electrical contacts or trace 82 on a ceramic card or substrate 74. The sensor 70 provides an electrical signal representative of fuel level, in dependence on position of the fuel float 72, to a conventional electronic engine controller EEC to control the solenoid 51' to actuate the valve 52' to open or close the inlet orifice 45 depending upon fuel level. Thus, when the fuel level in fuel tank 12 falls to predetermined low (near empty) level L, the fuel level sensor 70 sends a signal to cause the solenoid 51' to move the valve 52' to seat on orifice seat 45*a* and close off the inlet orifice 45 to the fuel tank. As described above for the embodiment of FIG. 1, the closure of orifice 45 will cause the diaphragm 40 to be moved by the fuel control valve 34 and spring 36 to allow spring 36 to close fuel control valve 34 on valve seat 32*a* to stop the engine based fuel starvation before air is ingested into the pump P. When the fuel level in fuel tank 12 is above the predetermined low level L, the fuel level sensor 70 sends a signal to cause the solenoid 51' to move the valve 52' to open relative to orifice seat 45*a* and open the inlet orifice 45 to the fuel in interior of the fuel tank in the manner described above.

Although the invention has been described with respect to certain embodiments thereof, those skilled in the art will understand that the invention is not limited to these embodiments and that modifications and changes can be made thereto without departing from the spirit and scope of the invention as defined in the appended claims.

What is claimed is:

1. Fuel shut-off device for use in a fuel tank to discontinue fuel flow to a fuel pump, comprising a valve seat forming a fuel flow opening for fuel to flow from said fuel tank to said fuel pump, a fuel control valve cooperably disposed relative to said valve seat to control fuel flow from said fuel tank to said fuel pump, a spring biasing said fuel control valve in a direction to a closed position against said valve seat, and a diaphragm movable in an opposite direction toward said closed position of said fuel control valve to open it relative to said valve seat against bias of said spring when the fuel level is above a predetermined low level and movable away from said closed position to allow said spring to close said fuel control valve relative to said valve seat when the fuel level is at the predetermined low level to provide insufficient flow of fuel from said fuel tank to said fuel pump to maintain engine operation when fuel level in said fuel tank is at said predetermined low fuel level.

2. The device of claim 1 wherein the diaphragm is movable in response to pressure in a control chamber communicated to a side of the diaphragm, said control chamber having an inlet orifice communicated to said fuel tank and an outlet orifice communicated to said fuel pump to provide a relatively higher pressure in said control chamber than in a fuel chamber on an opposite side of said diaphragm to cause said diaphragm to move to open said fuel control valve when said inlet orifice is open to said fuel tank and to provide a relatively lower pressure in said control chamber to allow said spring to close said fuel control valve when said inlet orifice is closed to said fuel tank.

3. Fuel shut-off device for use in a fuel tank to discontinue fuel flow to a fuel pump, comprising a valve seat forming a fuel flow opening for fuel to flow from said fuel tank to said fuel pump, a fuel control valve cooperably disposed relative to said valve seat to control fuel flow from said fuel tank to said fuel pump, a spring biasing said fuel control valve in a direction to a closed position against said valve seat, a diaphragm movable in an opposite direction toward said closed position of said fuel control valve to open said fuel control valve against bias of said spring and away from said closed position to allow said spring to close said fuel control valve, said diaphragm having a first valve-actuating side communicated to a fuel chamber for moving said fuel control valve relative to said valve seat against bias of said spring and a second side, said second side being communicated to a control chamber having an inlet orifice that is communicated to said fuel tank and an outlet orifice that is communicated to said fuel pump to provide a relatively higher pressure in said control chamber than in said fuel chamber to move said diaphragm toward said closed position to open said fuel control valve when said inlet orifice is open to said fuel tank and to provide a relatively lower pressure in said control chamber to move said diaphragm away from said closed position to allow said spring to close said fuel control valve when said inlet orifice is closed to said fuel tank, and an inlet orifice valve disposed in said fuel tank 1) to open said inlet orifice to said fuel tank when the fuel level is above a predetermined low level and 2) to close said inlet orifice to said fuel tank when the fuel level is at said predetermined low level.

4. The device of claim 3 wherein said inlet orifice valve comprises a float that is disposed in said fuel tank and movable with fuel level therein so as to close on said inlet orifice when fuel level is at said predetermined low fuel level.

5. The device of claim 3 wherein said inlet orifice valve comprises a solenoid actuated valve that is actuated to close said inlet orifice in response to said fuel level being at said predetermined low fuel level.

6. The device of claim 5 including a fuel level sensor in said fuel tank that provides a signal for actuating said solenoid valve to close said inlet orifice when said fuel level is at said predetermined low fuel level.

7. The device of claim 3 wherein said first valve-actuating side of said diaphragm is disposed above said fuel control valve and said control chamber is disposed above said second side.

8. The device of claim 7 wherein said first valve-actuating side includes a depending projection for pushing said fuel control valve downwardly against bias of said spring to the open position relative to said valve seat when said inlet orifice is open in response to the fuel level being greater than said predetermined low level.

9. The device of claim 3 wherein said spring comprises a coil spring that pushes said fuel control valve upwardly to the closed position relative to said valve seat when said inlet orifice is closed in response to fuel level being at said predetermined low fuel level.

10. The device of claim 3 including a base that rests on a bottom wall of said fuel tank.

11. A method of controlling fuel flow from a fuel tank to a fuel pump, comprising moving a diaphragm toward a closed position of a spring biased fuel control valve to move said fuel control valve against spring bias to an open position relative to a valve seat to provide flow of fuel from said fuel tank to said fuel pump when fuel level in said fuel tank is above a predetermined low fuel level and moving said diaphragm away from said closed position to allow spring bias to move said fuel control valve to said closed position relative to said valve seat to provide insufficient flow of fuel from said fuel tank to said fuel pump to maintain engine operation when fuel level in said fuel tank is at said predetermined low fuel level.

12. The method of claim 11 including moving the diaphragm in response to pressure in a control chamber communicated to a side of said diaphragm.

13. The method of claim 12 wherein said diaphragm is moved toward said closed position when fuel level is above said predetermined low fuel level by communicating the control chamber to said fuel tank and bleeding fuel from said control chamber in a manner to increase pressure in said control chamber to cause said diaphragm to open said fuel control valve.

14. The method of claim 13 wherein said diaphragm is moved away from said closed position when fuel level is at said predetermined low fuel level by terminating communication of said control chamber to said fuel tank and bleeding fuel from said control chamber in a manner to decrease pressure in said control chamber to allow spring bias to close said fuel control valve.

15. The method of claim 14 wherein communication of said control chamber to said fuel tank is terminated by a fuel float closing an inlet orifice to said control chamber.

16. The method of claim 14 wherein communication of said control chamber to said fuel tank is terminated by a solenoid actuated valve actuated to close an inlet orifice to said control chamber in response to a signal from a fuel level sensor in said fuel tank.

* * * * *